US006882643B1

United States Patent
Mauger et al.

(10) Patent No.: US 6,882,643 B1
(45) Date of Patent: Apr. 19, 2005

(54) SUPPORTING MULTIPLE SERVICES IN LABEL SWITCHED NETWORKS

(75) Inventors: Roy Harold Mauger, Herts (GB); Simon Daniel Brueckheimer, London (GB)

(73) Assignee: Nortel Networks Limited, St. Laurent (CA)

( * ) Notice: Subject to any disclaimer, the term of this patent is extended or adjusted under 35 U.S.C. 154(b) by 532 days.

(21) Appl. No.: 09/354,651

(22) Filed: Jul. 16, 1999

(51) Int. Cl.[7] .............................................. H04L 12/56
(52) U.S. Cl. ...................... 370/389; 370/401; 709/238
(58) Field of Search ................................ 370/389, 386, 370/352–356, 401, 392, 466, 395.4, 395.5–395.54, 235, 467, 353, 400, 349, 355, 393, 470, 471, 474, 475, 409; 709/395.1–395.32, 236, 238, 242

(56) References Cited

U.S. PATENT DOCUMENTS

| | | | |
|---|---|---|---|
| 6,205,488 B1 * | 3/2001 | Casey et al. ................. | 709/238 |
| 6,275,493 B1 * | 8/2001 | Morris et al. ............. | 370/395.4 |
| 6,295,296 B1 * | 9/2001 | Tappan ........................ | 370/392 |
| 6,331,978 B1 * | 12/2001 | Ravikanth et al. .......... | 370/392 |
| 6,336,129 B1 * | 1/2002 | Ise et al. ..................... | 709/201 |
| 6,339,595 B1 * | 1/2002 | Rekhter et al. ............. | 370/392 |
| 6,385,170 B1 * | 4/2002 | Chiu et al. .................. | 370/235 |
| 6,408,001 B1 * | 6/2002 | Chuah et al. ............... | 370/392 |
| 6,507,577 B1 * | 1/2003 | Mauger et al. ............. | 370/356 |

FOREIGN PATENT DOCUMENTS

| | | |
|---|---|---|
| EP | 0 579 567 | 5/1993 |
| EP | 0 637 153 | 7/1993 |
| EP | 0 660 569 | 12/1993 |

OTHER PUBLICATIONS

Sriram et al., "Anomalies Due to Delay and Loss in AAL2 Packet Voice Systems: Performance Models and Methods of Mitigation", Jan. 1999, IEEE, pp. 4–17.*

* cited by examiner

Primary Examiner—John Pezzlo
(74) Attorney, Agent, or Firm—Barnes & Thornburg (57) ABSTRACT

A telecommunications network architecture provides transport and switching of user services, particularly PSTN/ISDN services. In the network, connections are set up between end points which typically comprise narrow band exchanges serving subscribers. Calls are set up between the end points via call servers using e.g. ISUP signalling between the end points or exchanges and the call servers. The call servers set up connections via a concatenated series of paths or tunnels across an intermediate MPLS network via media gateways serving respective nodes in the MPLS network. User information packets are carried across the MPLS network by the attachment of an appropriate label, this label being removed on egress from the MPLS network to recover the original packet.

10 Claims, 8 Drawing Sheets

SUPPORTING MULTIPLE SERVICES IN LABEL SWITCHED NETWORKS

BACKGROUND OF THE INVENTION

This invention relates to a method and architecture for supporting services in a telecommunications network.

FIELD OF THE INVENTION

Traditionally, two types of legacy telecommunication networks have been developed. The first type is connection oriented and is used for the transport of narrow band voice traffic, typically carried in TDM frames. Such networks comprise for example synchronous or plesiochronous networks. The second type of legacy network is connectionless in nature and is used for the transport of broad band packet or cell-based data traffic. Such packet traffic includes for example Internet protocol (IP) traffic. There is currently a drive towards unified networks which provide end to end transport for both voice and data services, and to this end the use of asynchronous transport has been introduced.

Asynchronous Transfer Mode (ATM) was the technology specified by the ITU-T as a broadband network technology suitable for all applications. For Internet protocol traffic however, ATM has proven to be ineffective at supporting Layer 3 routed applications such as routed virtual private networks. This led the IETF to specify Multiprotocol Label Switching (MPLS) as a technology which inherits the desirable characteristics of ATM but is better matched to the Internet protocol. In particular MPLS provides a frame merge function in which data frames received from multiple sources are captured and sent out with a common label. This is key to support of Internet protocol Layer 3 Routed services. Service providers would ideally prefer a single network technology to support all of the services that they provide as this would achieve the lowest possible operational cost.

Although there would be clear advantages in the use of MPLS to replace ATM as a broadband technology for all applications its current inflexibility in the handling of certain services, particular for PSTN/ISDN, Leased-line, Frame Relay and ATM services, has restricted its general adoption by network operators.

SUMMARY OF THE INVENTION

An object of the invention is to minimise or to overcome the above disadvantage.

A further object of the invention is to provide an improved arrangement and method for providing MPLS transport in a telecommunications network.

According to a first aspect of the invention, there is provided a method of transporting a telecommunications information packet to an end point in a network incorporating a multiprotocol label switching network, the method including defining a plurality of first level paths across the multiprotocol label switching network, defining a second level path comprising a concatenated series of said first level paths attaching a label to the information packet indicative of said second level path at an ingress to the multiprotocol label switching network, transporting the labelled packet over said second level path, removing the label from the packet, and delivering the packet to the end point.

According to a further aspect of the invention, there is provided a telecommunications network incorporating a multiprotocol label switching network arranged to transport information packets between end points, the telecommunications network including means for defining a path across the multiprotocol label switching network, said path comprising a plurality of concatenated paths, means for attaching labels to the information packets indicative of said path at an ingress to the multiprotocol label switching network, transporting the labelled packets over said path, removing the labels from the packets, and delivering the packets to a said end point.

According to a further aspect of the invention, there is provided a telecommunications network incorporating a multiprotocol label switching network comprising a plurality of abstract nodes and arranged to transport information packets between end points, the telecommunications network including means for defining a first set of paths between pairs of said abstract nodes in the multiprotocol label switching network, means for defining a second level path comprising a plurality of concatenated paths from said first set of paths, means for attaching labels to the information packets indicative of said second level path at an ingress to the multiprotocol label switching network so as to transport the labelled packets over said defined second level path, and means removing the labels from the packets on egress from said second level path and for delivering the packets to a said end point.

In a preferred embodiment, the invention relates to an architecture for supporting multiple service types over label switched networks. The IETF has defined a multiprotocol label switch (MPLS) as a means of providing traffic engineering in Internet protocol networks.

The invention provides an arrangement and method that enables MPLS to be extended to allow multiple services to be carried transparently by providing MPLS with session switched capabilities having QoS guarantees; providing MPLS transparency to other forms of frame or cell information; and adapting existing services to transparent frames or cells over MPLS switched sessions.

Reference is here directed to co-pending U.S. application Ser. No. 09/345,069, filed 30 Jun. 1999 entitled 'Establishing Connections with a pre-specified Quality of Service across a Communication Network' (file reference, 10559ID, inventor M Gibson) and assigned to the present assignee. That application discloses a method whereby MPLS can be extended to provide on-demand connection oriented services with quality of service (QoS) guarantees.

Further benefits and advantages of the invention will become apparent from a consideration of the following detailed description given with reference to the accompanying drawings, which specify and show preferred embodiments of the invention.

BRIEF DESCRIPTION OF THE DRAWINGS

Preferred embodiments of the invention and its best mode of operation will now be described with reference to the accompanying drawings in which.

DESCRIPTION OF PREFERRED EMBODIMENTS

Figure 1:
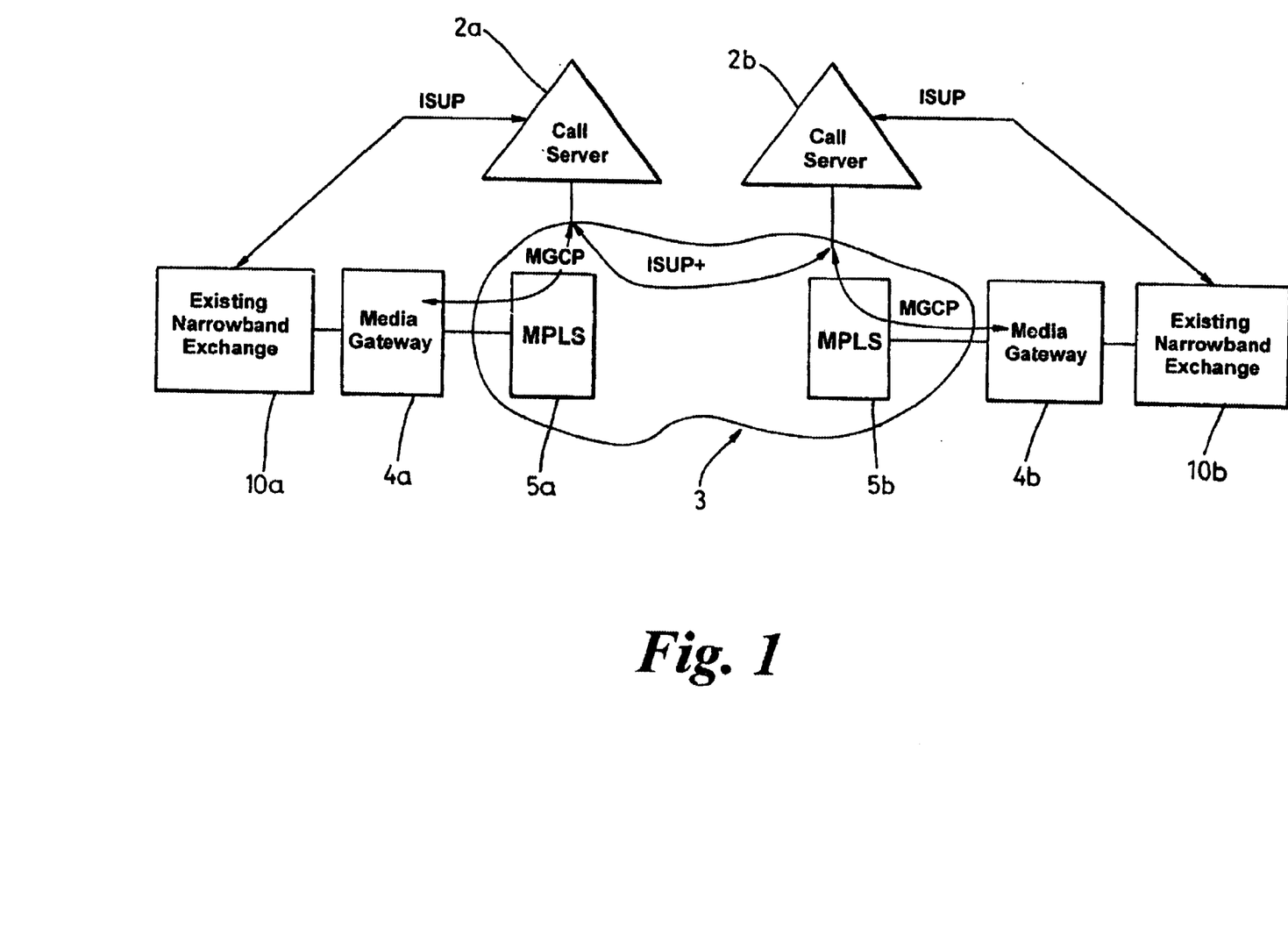
FIG. 1 is a schematic of a first embodiment of a network architecture to support PSTN/ISDN services.

Referring first to FIG. 1, this shows in schematic form an exemplary network architecture for providing user services, particularly PSTN/ISDN services. In the network of FIG. 1, connections are set up between end points 10a, 10b which typically comprise narrow band exchanges serving subscribers (not shown). Calls are set up between end points via call servers 2a, 2b using e.g. ISUP signalling between the end points or exchanges and the call servers. The call servers set up connections via paths or tunnels across an MPLS network 3 via media gateways 4a, 4b serving respective nodes 5a, 5b in the MPLS network. For clarity, only two nodes are depicted in the MPLS network, but it will of course be appreciated that a path through this network will in general traverse several such nodes.

The network architecture for PSTN/ISDN services depicted in FIG. 1 conforms to the emerging IETF Megaco architecture operating over an MPLS core network. The call servers 2a, 2b provide processing of signalling requests. The media gateways 4a, 4b adapt telephony terminals into MPLS packets and a media gateway control protocol (MGCP) is used to control the media gateways in order to provide connections of media paths for the call. Signalling between the call servers is advantageously by means of ISDN Services User Part of signalling system No7 (ISUP+). ISUP+is a modified version of ISUP specified by the ITU-T in order to carry session identification and IP address information between the call servers.

Figure 2:
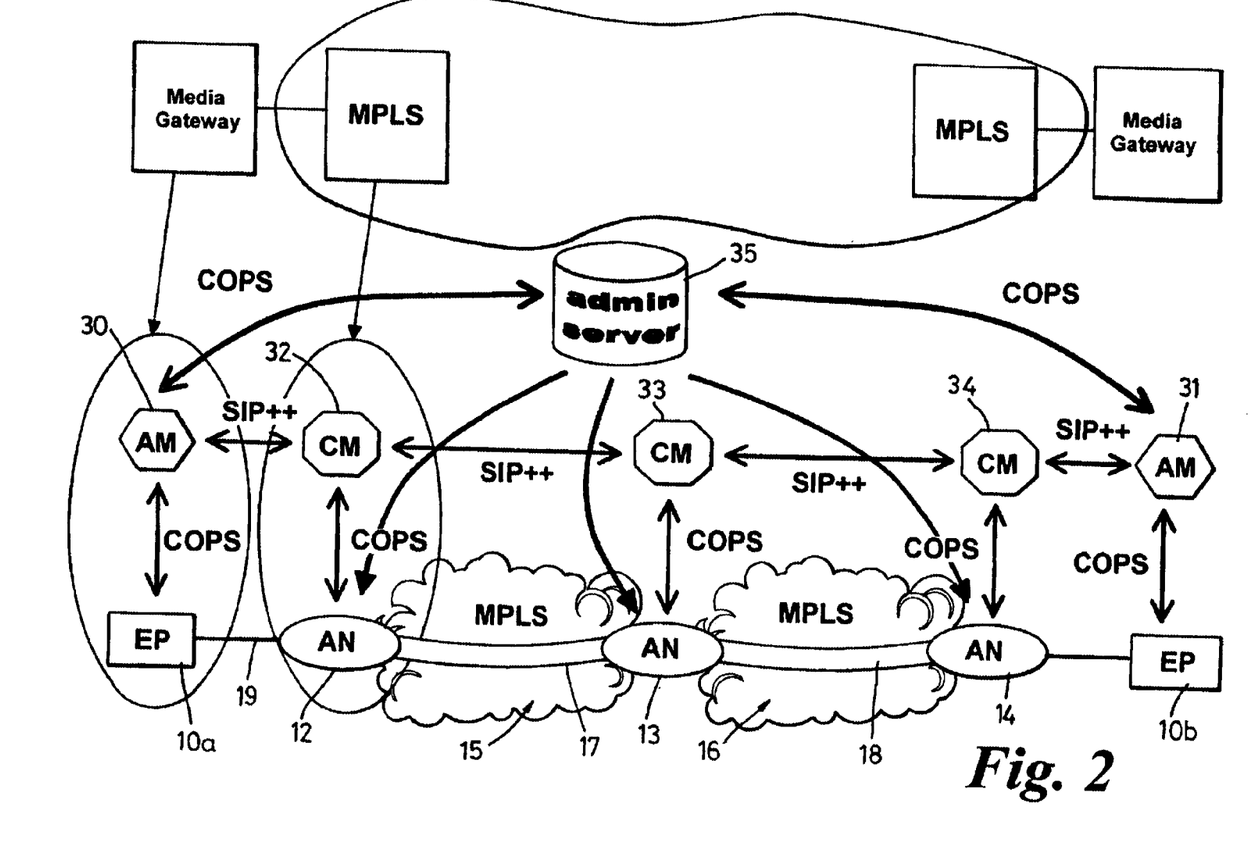
FIG. 2 shows the MPLS parts of the network of FIG. 1 in further detail.

The internal construction of the MPLS network 3 of FIG. 1, is illustrated schematically in FIG. 2 and is so constructed as to support connection oriented services with QoS guarantees. As shown in FIG. 2, the MPLS network incorporates an administration server 35 which provides a first level of MPLS tunnels which are used to segregate the MPLS network into service sub-networks. Admission managers 30, 31 and connection managers 32, 33, 34 are used to select routes for a second level of MPLS tunnels which are contained within the first level of tunnels 17, 18 and are used to create dynamic switched session services to users.

As shown in FIG. 2, a first endpoint 10a is connected to another endpoint 10b via the MPLS network which comprises a plurality of nodes that are connected by links. These nodes include three abstract nodes 12, 13, 14 and many other nodes which for clarity are not shown individually but which are represented by cloud shapes 15, 16 between the abstract nodes. These cloud shapes 15, 16 are intended to represent parts of the MPLS network.

Links 17, 18 are provided and these connect the abstract nodes 12, 13, 14 in series. Links 19, 20 are also provided to connect each endpoint 10a, 10b to an abstract node and thus form a path or tunnel between the endpoints. However, this path from the first endpoint 10a, via link 19 to abstract node 12 which is connected in series to abstract nodes 13 and 14, and then via link 20 to the second endpoint 10b, is only one of many possible paths over the communications network which connect the two endpoints 10a, 10b. These other paths are not explicitly shown in FIG. 2 but are intended to be represented by the presence of clouds 15, 16.

Data or messages which are transmitted via the MPLS network can be thought of as comprising two types. First, customer data or messages such as video signals, voice signals or email messages and second, control data or messages. This control data functions to help manage the communications network; for example, control messages may comprise signals broadcast by a node in the communications network to advertise its presence or its failure. The method of using the control messages is defined by the type of messaging protocol(s) used.

In a preferred embodiment, the MPLS standard messaging protocol is used in conjunction with the CR-LDP messaging protocol to help manage the communications network comprising the endpoints 10a, 10b, the abstract nodes 12, 13, 14, the clouds of nodes 15, 16 and the links between these. However, as described CR-LDP, while able to make quality of service reservations across known paths, is unable to determine these paths itself. In the present invention additional components and messaging protocols are provided in order to determine and reserve guaranteed quality of service for particular connections for particular paths over the network.

These additional components as discussed above comprise an administrative server 35, admission managers 30, 31 and connection managers 32, 33, 34. The additional messaging protocols include the standard Common Open Policy Service (COPS) messaging protocol and a modified version of the standard IETF SIP (Session Initiation Protocol) RFC2543 protocol although these are all examples of preferred messaging protocols; any suitable messaging protocols may be used. The modified version of SIP is designed to work in conjunction with COPS, CR-LDP and MPLS, although it could be designed to work with similar messaging protocols to perform the same function. This modified version of SIP will be referred to as "SIP++" in the following description. A further description of the SIP++ messaging protocol is given in our aforementioned co-pending application.

The arrangement provides Switch Virtual Circuit (SVC) admission control equivalency with guaranteed quality of service on an MPLS or similar communications network. An SVC is a path over a communications network between two endpoints which is effectively dedicated for a particular communication session. These SVCs may be used to carry one or more communication sessions. A brief "overview" of the manner in which this is achieved is now described.

When a user requests a connection for a communication session this request is passed to an endpoint to which a terminal accessed by the user is connected. Means is provided to determine possible paths for the required connection together with measures of preference for these possible paths. The measures of preference (for example, ranks) are determined on the basis of factors such as traffic levels in the network, length of path, and available capacities. One path is chosen on the basis of the measures of preference. For example, a path with the highest rank may be chosen and reserved for the requested communication session. This gives a reserved path which can be used to provide a guaranteed quality of service for a particular communication session. Any suitable measure of preference such as a score, percentage value or rank may be used.

In a preferred embodiment, a ranking mechanism is used to select from the set of suitable paths, the route a new session will use to traverse an MPLS network. This set of paths and their ranking varies with network load.

In order that the ranks may provide an effective means for choosing between possible paths an advertising mechanism is provided which allows entities in the communications network to gain information about traffic levels, topology of the network and other factors. This information can then be used to help make the decision about which path to choose. The advertisement mechanism allows the system to choose routes best suited to the session being established. Two methods are proposed: explicit registration or by passively piggybacking information on path setup messages. The rate of advertisement is a function of the rate of session set-up.

As well as an advertising mechanism, in order to reduce the complexity of choosing a path, a mechanism is provided whereby an overlay network is configured to provide a set of high capacity routes across the MPLS clouds which function as "trunk" routes or "motorways". An arrangement is then made that communication sessions are preferably established using these pre-determined high capacity routes. This helps to reduce the topology information needed to establish a path across a communications network. By using a constrained set of paths between the routers that comprise the MPLS network, the set of routes is constrained to reduce the total topology information needed to route across the network.

Referring again to FIG. 2, it can be seen that the admission managers 30, 31 and the connection managers 32, 33, 34 as well as the administrative server 35 are depicted above the MPLS network. The admission managers, connection managers and administrative server can be thought of as a "management layer" of the communications network. However, this layer is not physically independent from the rest of the communications network. For example, the SIP++protocol control messages may be transmitted over the same physical links as the user information during communication sessions.

Each endpoint 10a, 10b is associated with an admission manager 30, 31 and each abstract node 12, 13, 14 is associated with a connection manager 32, 33, 34. As indicated in FIG. 2, communication between the endpoints and their associated admission managers and between the abstract nodes and their associated connection managers is carried out using the COPS protocol. Also, communication between the administrative server 35 and the admission managers 30, 31 or abstract nodes 12, 13, 14 takes place using the COPS protocol. The way in which this is achieved using the COPS protocol is described in more detail below. However, communication between the admission managers and connection managers takes place using SIP++.

The characteristics of some of the components of the communications network are now described:

Abstract nodes 12, 13, 14 are a concept introduced by the CR-LDP protocol and represent one or more label switch routers (LSRs) which are connected together by links. By using a description equivalent to a subnet mask a whole group of LSRs can be referred to. A subnet mask is an Internet Protocol (IP) mechanism used to define a group of IP nodes by only using the first n bits of their 32-bit IP addresses, where n is less than 32. IPV4 is assumed, although the method is of course equally applicable to other IP versions. The abstract nodes run the CR-LDP protocol and remain unaware of the SIP++protocol running between admission managers and connection managers. Each abstract node may be directly configured by the Administrative Server, which may instruct an abstract node to establish a path to another particular abstract node. In the case where a CR-LDP network is used this path is referred to as a label switch path (LSP). SIP++ or any other suitable messaging protocol used provides a means of determining which of the label switch routers in an abstract node a path should be routed through.

By using abstract nodes when selecting path candidates for a new session it is possible to be presented with a set of diverse routes. This provides the advantage that different routes over the network can be utilised and this is especially helpful if it is required to "spread load" over the network and if problems occur in localised regions of the network.

Endpoints

An endpoint 10a, 10b is any node in the communications network through which a user may request a communication session on the communications network. For example, in the case that an MPLS communications network is used an endpoint can be any MPLS device; either an MPLS enabled terminal or a router at the edge of the network. New communication sessions requested by an endpoint are sent to an admission manager that is associated with the endpoint. That admission manager then uses the SIP++protocol and a path for the requested session is determined and reserved in order to guarantee the requested quality of service. Once the admission manager has completed this task, the user request is validated and the validation communicated to the endpoint using the COPS protocol. Together with the validation, details of the chosen, reserved path are provided to the endpoint together with an identifier for the reserved path. If the request for a new session is granted, the endpoint runs the CR-LDP protocol using the exact same parameters that were used in the COPS request for a communication session together with the details of the chosen, reserved path. The CR-LDP protocol then establishes a path for the communication session according to the standard CR-LDP method described below. Each endpoint is therefore effectively unaware of the SIP++protocol running between the admission managers and connection managers.

Admission Managers

Each admission manager 30, 31 is responsible for maintaining network topology information and using this to select a route across the network. When an admission manager receives a request for a communication session from an endpoint 10a, 10b it issues a plurality of path requests, which in a preferred example of the SIP++protocol are referred to as INVITE messages. These path requests are control messages whose function is to request and determine possible paths between the required endpoints. In order to issue these path requests effectively, an admission manager needs to maintain accurate topological information about at least part of the communications network. Route advertisements are broadcast by entities in the communications network and an admission manager processes all the route advertisements it receives. This enables the admission manager to build up a map of all the reachable nodes on the MPLS network and their availability over time. An admission manager also monitors the bandwidth of connections to edge abstract nodes for the endpoint EP that it is associated with. (An edge abstract node is an abstract node that is positioned towards the edge of a communications network.) In this way an admission manager effectively provides admission control to the communication network. Communication between an admission manager and its associated endpoint is via an interface such as a COPS interface. An interface to the administrative server 35 is also provided, which may be a COPS interface. This allows endpoints to request new tunnels or paths (for example new "trunk" routes) in the communications network such as an MPLS network. An admission manager is also arranged to respond to INVITE messages issued by other admission managers.

Connection Managers

Each connection manager is associated with an abstract node and as described above an abstract node may comprise one or more Label Switch Routers LSRs. However, it is not essential for all label switch routers to be associated with a connection manager.

Connections from these label switch routers to other abstract nodes are termed "label switch paths" (LSPs). Each connection manager monitors the bandwidth used in each of the label switch paths that emanate from the label switch router (or group of label switch routers) which it is associated with (or managing). It also is responsible for advertising the level of congestion in these label switch paths to other administrative elements (such as other connection managers and admission managers) on a slow but regular basis.

A connection manager also keeps a record of the destination abstract node for each of the label switch paths that it is monitoring. This information is also advertised by the connection manager. A connection manager also uses a COPS interface from the abstract node it is monitoring to allow registration of new label switch paths or a change in parameters of an existing label switch path.

Administrative Server

An administrative server 35 is used to provision paths in the communications network upon initialisation. For example, this involves establishing the label switch paths that the SIP++protocol routes over. It is also used to change the characteristics of an existing path or introduce a new one. Although pictured as a single entity in FIG. 2, an administrative server 35 may take the form of multiple servers that administer their local area.

An Administrative Server is able to communicate directly with any label switch router in a 'known' abstract node. It uses CR-LDP over this interface to provision high capacity label switch paths between these label switch routers via any number of intermediate label switch routers. Typically this will be through label switch routers with no associated connection manager, though this need not necessarily be the case. An administrative server has a much more detailed view of the topology of the intermediate MPLS network than the endpoints attached to it. By pre-provisioning label switch paths of high capacity the administrative server constrains the number of possible routes between two endpoints for a proposed communication session of a given capacity. This reduces the level of detail needed to make routing decisions.

An Administrative Server may also add new paths or change the characteristics of an existing path during the operation of the network. This may either be initiated by the network provider or via a request mechanism.

Request Mechanism

The Administrative Server 35 has a COPS interface to all the admission managers at the edge of the network. This interface is used by those admission managers to request new high capacity label switch paths across the MPLS network, or to request a change in the capacity of an existing LSP.

A Session Initiation Protocol (SIP) used to provide communication between the admission managers 22 and connection managers 23. This is a modified version of the IETF protocol and is designed to operate in conjunction with COPS, CR-LDP and MPLS, although it could of course be adapted to operate with similar messaging protocols. This modified version of SIP will be referred to in the following description as SIP++. An extension to the IETF Common Open Policy Service (COPS) in provides communication between the physical MPLS network and its control services.

Call Walkthrough for Successful Call

Figure 3:
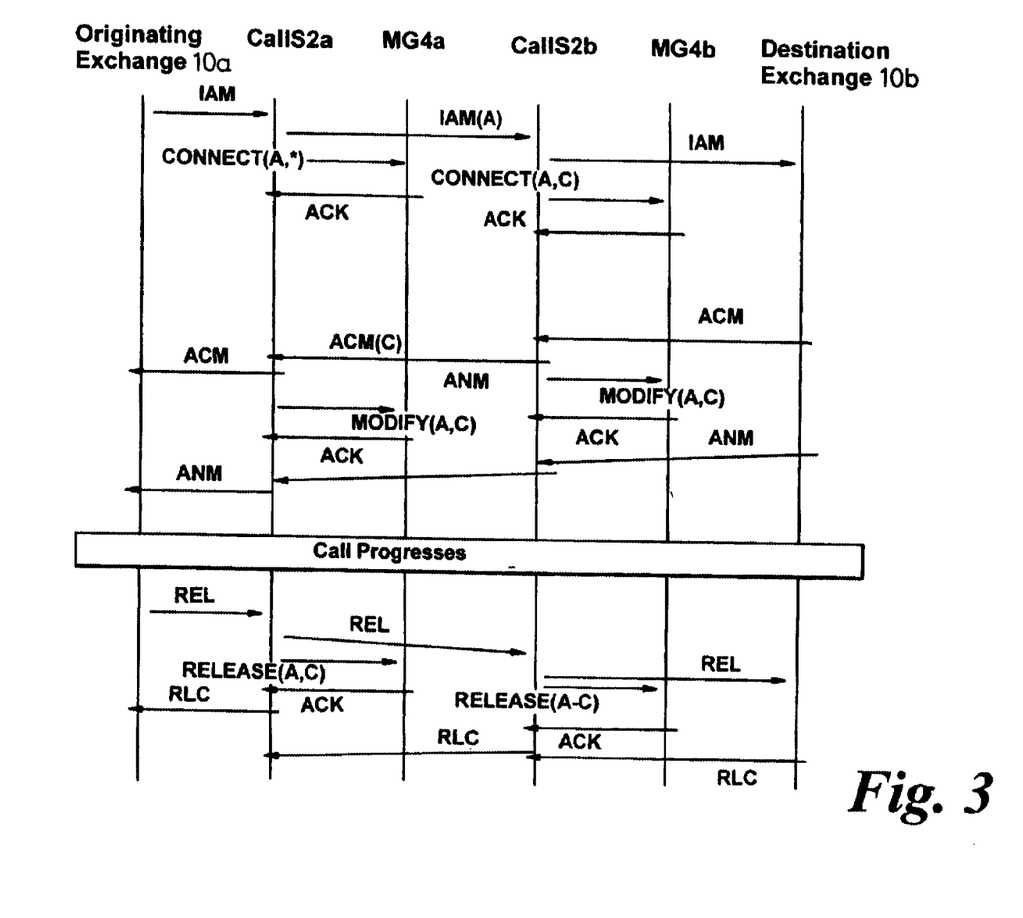
FIG. 3 is a call walkthrough diagram for a PSTN/ISDN call in the network of FIG. 1.

A call walkthrough for a successful call is illustrated diagrammatically in FIG. 3. This figure corresponds to the level of detail shown in FIG. 1. An Initial Address Message (IAM) is sent from an originating exchange to the first call server 2a. This call server then sends a connect message to its media gateway 4a. At this point the IP address A of the originating terminal is known but the destination address has yet to be determined. Following completion of this command, call server 2a sends an ISUP+message (IAM) which identifies the IP Address A to the second call server 2b as well as providing a session identifier. Call server 2b selects an outgoing media gateway port with IP Address C, i.e. the destination address, and sends a corresponding IAM message to the destination exchange. Call server 2b sends a Connect message to its Media Gateway 5b identifying the IP Addresses A and C. Call Server 2b now receives an Address Complete Message (ACM) from the destination exchange 1b. In response to this message, it adds the ISUP+ information (Session Id and IP address C) and forwards the ACM to Call Server 2a. Call Server 2a is now able to complete the connection request it made to its Media Gateway 5a which it does using a Modify command. At some point an Answer signal (ANM) is received and the set-up process is completed.

When the call has been completed, tear down of the connection is effected by an analogous release messaging sequence indicated in the lower portion of FIG. 3.

ATM over MPLS

Figure 4:
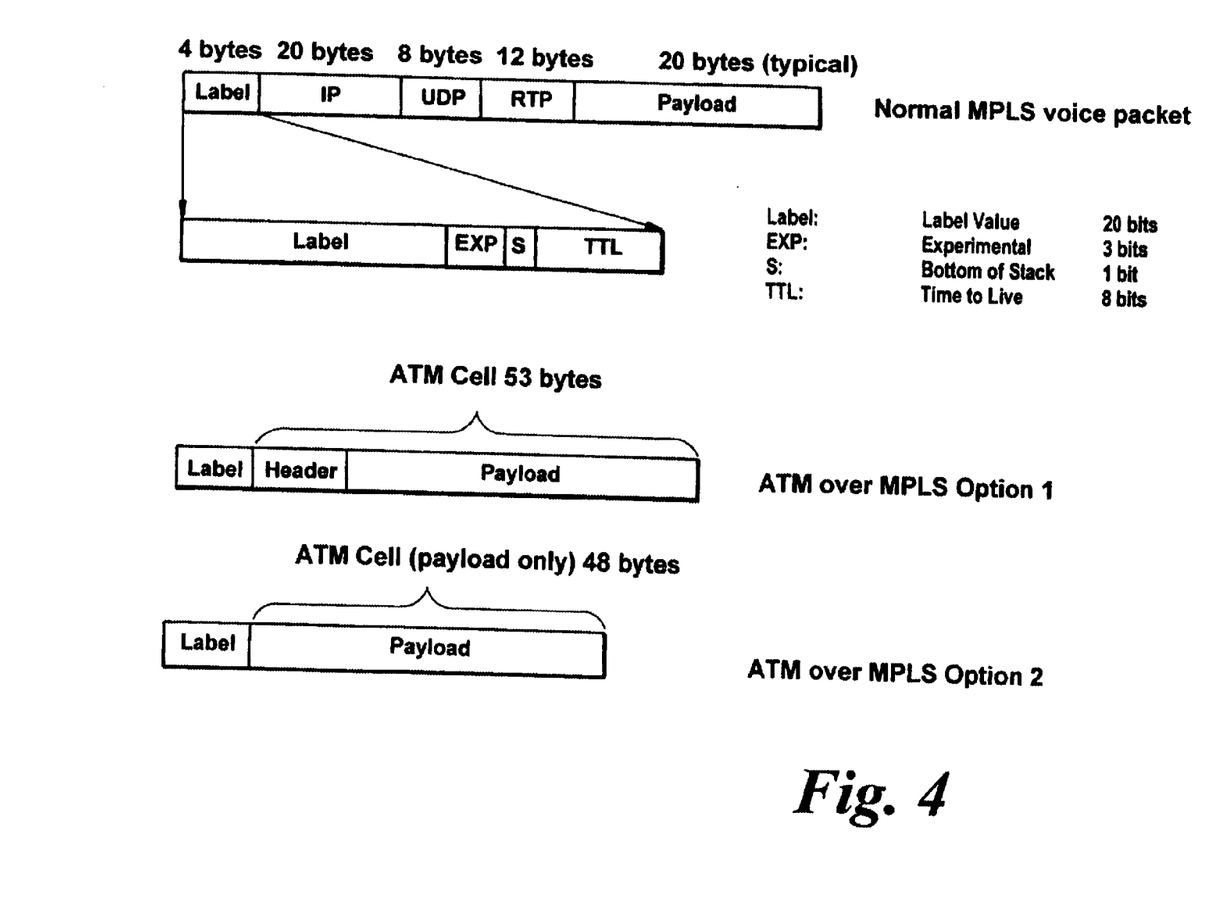
FIG. 4 is an illustration of a method of transporting ATM cells over the MPLS parts of the network of FIG. 1.

Referring now to FIG. 4, this illustrates a method of labelling communications packets for transport across the MPLS network. A typical MPLS voice packet is illustrated in FIG. 4. The example is for G729 voice coding with 20 msec packetisation. Each packet comprises 40 bytes of the IP Real-time Protocol stack (RTP/UDP/IP) as well as a 4 byte label. The IP Real-time protocol stack is not inspected by the MPLS part of the network it is passed transparently through to end systems. If the end systems are not IP then the RTP/UDP/IP information is largely redundant. As MPLS works solely on the basis of the Label content it is possible to transfer any information transparently over an MPLS network. In FIG. 4 two options for transferring ATM over MPLS are shown, although it will of course be appreciated that it would also be possible to transfer other frame structured information such as MPEG video in a similar transparent way. If it is desired to use ATM addressing and ATM maintenance then the full ATM cell should be carried transparently, if it is desired to only use the ATM Adaptation layer functions them the cell payload is all that is required. For the PSTN/ISDN application then ATM Adaptation layers 1 or 2 are all that is required. For the G729 example quoted above the AAL2 adaptation overhead is 3 bytes as compared with the 40 bytes of the IP Real-time protocol stack.

MPLS Session Establishment

Figure 5:
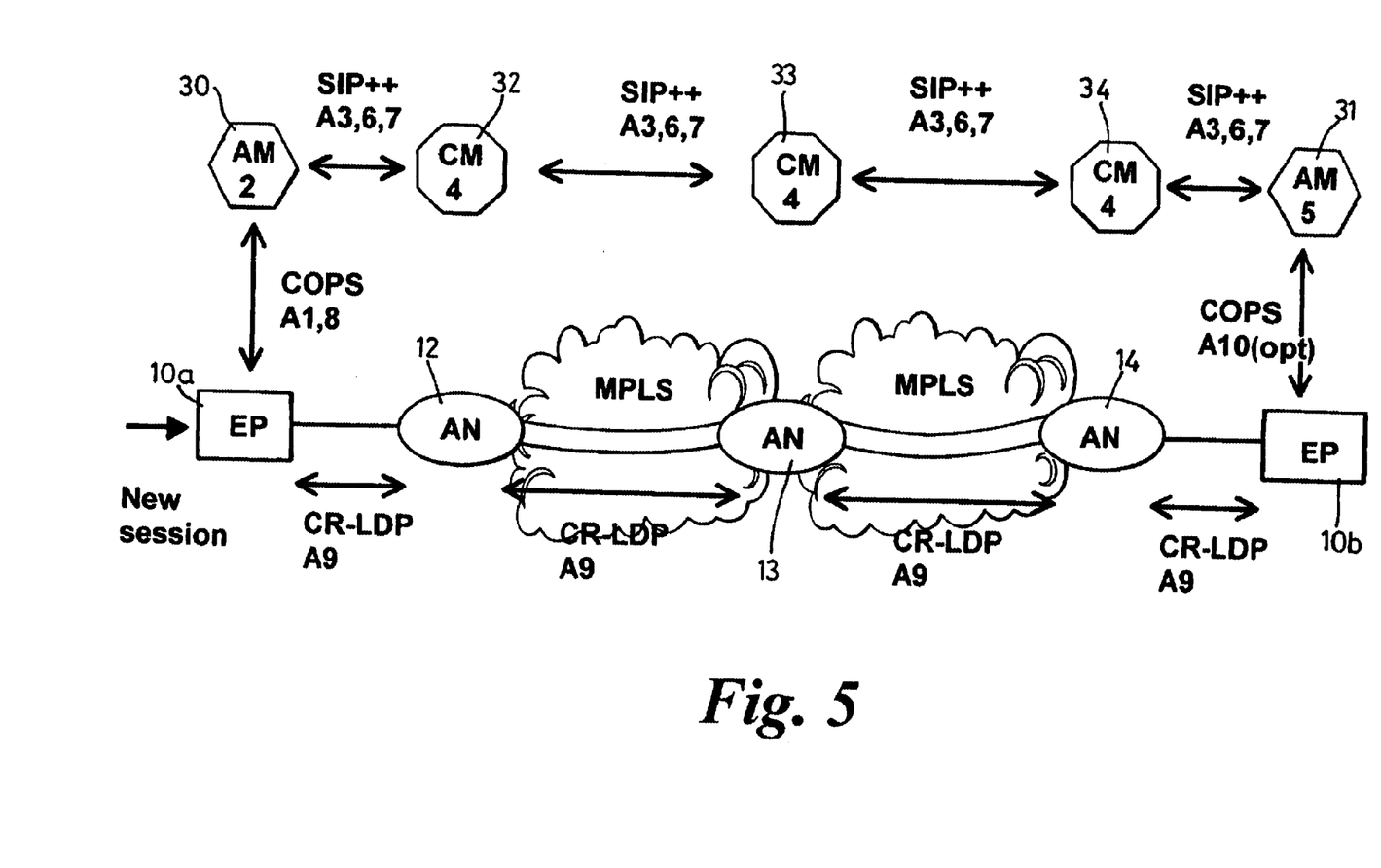
FIG. 5 is a connection walkthrough of FIG. 2.

An example of the messaging used to establish a communication session across a communications network and provide a guaranteed quality of service is now described with reference to FIG. 5. In the schematic diagram of FIG. 5, the message numbering follows the SIP standard, but it will of course be understood that the technique is in no way limited to this particular standard.

The first event is the arrival at an endpoint 10a of a new session request. There is no restriction on the type of request this can be, though it must obviously be one the endpoint 10a understands. This causes the endpoint 10a to send a COPS request (labelled A1) to its associated admission manager 30. Upon receipt of this request, the admission manager 30 determines the path or paths it will attempt to use to route the session to its destination. This may be either an explicit path or may use abstract nodes, depending on the amount of network topology information available to the admission manager 30. Using its view of the network congestion and any associated route selection policies, the admission manager 30 assigns a rank to each of the paths it has determined.

The Admission Manager 30 then forms one INVITE message for each of the paths using the same Call-ID for each, but different Cseq values. Each INVITE message includes a path element, an associated rank and a traffic element in the message body. It will also include a session description message body. Each INVITE message is then sent (A3) to each of the connection managers 32, 33, 34 in turn that control Abstract Nodes 12, 13, 14 respectively in the specified path before finally reaching the destination admission manager 31.

At each Connection Manager 32, 33, 34 in the path, the path element of the INVITE message is interrogated for the next abstract node. The connection manager then determines if it has a label switch path (LSP) to that abstract node with sufficient free resource by comparison with the traffic element. If it has, it writes its SIP-URL into the Record-Route header of the INVITE message. The connection manager now adds a temporary soft-state reservation associated with the call-ID along the path and awaits confirmation. The connection manager may also choose to add a congestion message body to the message. The INVITE is now forwarded to all connection managers whose abstract nodes were identified as suitable next hops. The final connection manager in the MPLS network will implicitly perform an unforking operation by routing all INVITE messages to a single admission manager 31. If the final abstract node 14 is not described by an explicit address, an error response is generated.

If any of the traversed connection managers 32, 33, 34 in the path have a next hop LSP which is currently too congested that connection manager responds with an 801/802 error response and ceases forwarding the INVITE message. The Record-Route header is used to route the response back. Any connection managers this error response traverses then update their congestion information accordingly. If the next hop LSP is not congested but unavailable for some other reason, an 803 response is sent and if the next abstract node in the path is simply unreachable from this connection manager, an 804 response is sent.

The destination Admission Manager 31 eventually receives one or more INVITE messages. Upon receipt of the first INVITE message for a new session (i.e. an INVITE message that has an unrecognised Call-ID) a timer starts and all INVITE messages with the same Call-ID received within the time limit are processed. The Admission Manager 31 then begins to form a 200 OK response. It uses the Record-Route headers of each incoming INVITE message to determine the path taken by that message. It ranks each of these paths and by convolution with the original ranking scores, it chooses a preferred path. Any suitable path weighting and cost algorithms may be used to help form the rank.

The destination admission manager 31 now sends one 810 response per original INVITE message whose path was not used (i.e. one per CSeq value). It also then sends a 200 OK response for the chosen path, using the Record-Route header of the original to form the path element in the message body. The Record-Route is then also used to make a Route header. Finally, the Admission Manager 31 stores the session description and Call ID before returning the 200 OK message A6. As this message traverses the connection managers 34, 33, 32 listed in the Route header, it triggers the making of permanent reservations for the session at each traversed connection manager by up dating the existing soft-state reservation.

On receipt of the 200 OK message, the originating Admission Manager 30 closes the SIP++negotiation process by sending an ACK message A7 back across the network using the chosen path as its route—gleaned from the received Route header. The receiving Admission Manager 31 uses this ACK message to update its congestion information with the new session and as a confirmation of the path chosen. The originating Admission Manager 30 also updates its path description for the session to reflect the chosen path.

The Originating Admission Manager 30 now finally sends a COPS Decision A8 back to its endpoint 10a. This message contains the chosen, reserved, path to use in the subsequent CR-LDP session and the Call-ID. It may optionally include the traffic information as a failsafe check that the correct parameters are used. The Report State response may include the label issued by CR-LDP for this session. However, note this can only be sent after the CR-LDP protocol has set up the required path. Inclusion of the label issued by CR-LDP in the Report State response is useful if re-provisioning the path for a change in the session characteristics.

The Endpoint 10a now starts a CR-LDP negotiation A9 using the path of explicit nodes 12, 13, 14 and including the Call-ID as a vendor specific TLV. CR-LDP establishes a path through the specified LSRs. At the receiving Endpoint 10b, an optional COPS exchange A10 can be initiated to discover the label assigned to this new session so that a cut-through path can be established which maps the incoming label directly onto the correct forwarding path for the session.

This MPLS session establishment can be invoked within the media gateway at the point in time when the two IP addresses for the call have been communicated in MGCP commands. Referring to the call walkthrough of FIG. 3, this is following the Connect(A,C) command in Media Gateway 4b which establishes a session for the return speech channel and following the Modify(A,C) command in Media Gateway 4a which establishes a session for the forward speech channel.

Figure 6:
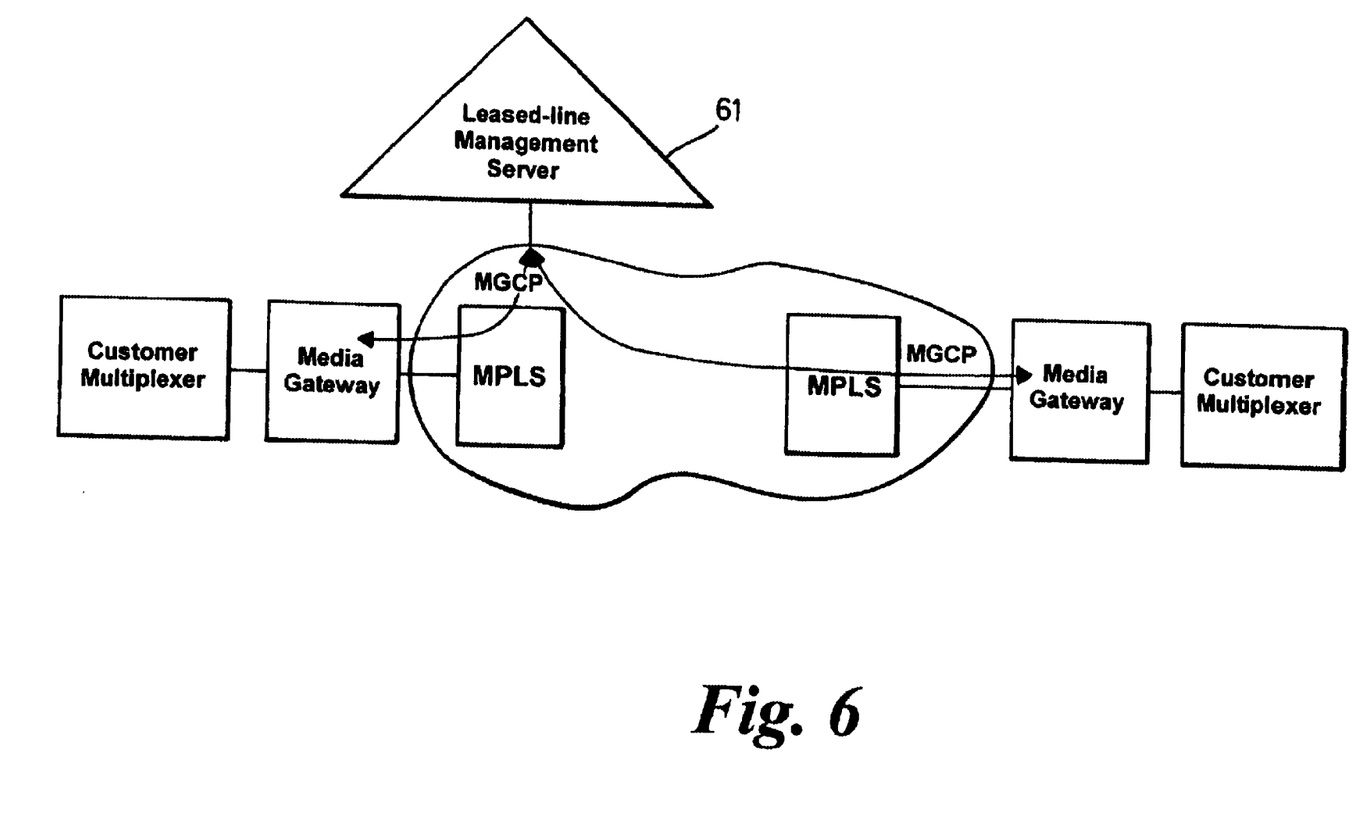
FIG. 6 shows a second embodiment of a network architecture for supporting leased-line services.

An alternative embodiment comprising a network architecture for leased-line services is illustrated in FIG. 6. This arrangement is able to use the session establishment scenario of FIG. 5 via a leased line management server 61 in the same way as described above by invocation following MGCP connection control commands. For Leased-lines it is likely that ATM maintenance messaging would be required in order to measure error rate and monitor continuity. In this case the full ATM cell should be carried over the MPLS network by attachment of an appropriate label to the cell.

Figure 7:
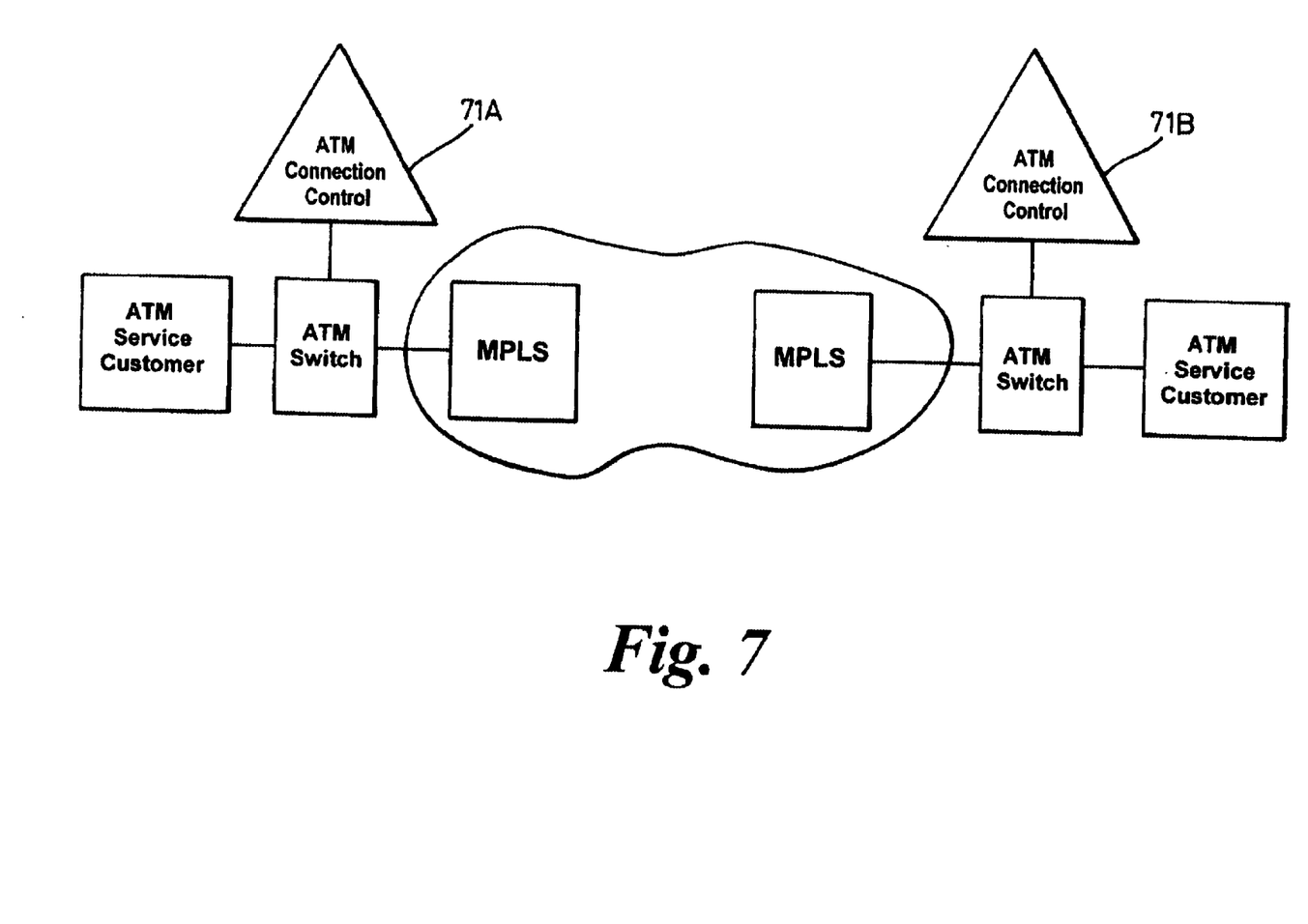
FIG. 7 is a network schematic for supporting ATM services on the network.

A further embodiment comprising a network architecture for ATM services is illustrated in FIG. 7. In this arrangement, the MPLS network is not involved in dynamic ATM connection establishment, it simply provides a tunnelled transport capability over which the ATM service is provided transparently via ATM connection control 71a, 71b. ATM signalling is also carried transparently between ATM edge switches 72a, 72b.

Frame Relay services can be provided according to the model of FIG. 6 or 7. In the FIG. 6 model a Frame Relay management server replaces the Leased-line management server and each Frame Relay connection maps to an MPLS session. In the Model of FIG. 7 there are two further options:

Frame Relay switches can be deployed around an MPLS core with the MPLS core providing only transport layer adaptation in which the Frame Relay packets are provided with an MPLS Label but are otherwise unchanged.

Frame Relay can be adapted to ATM and treated as any other ATM service.

Figure 8:
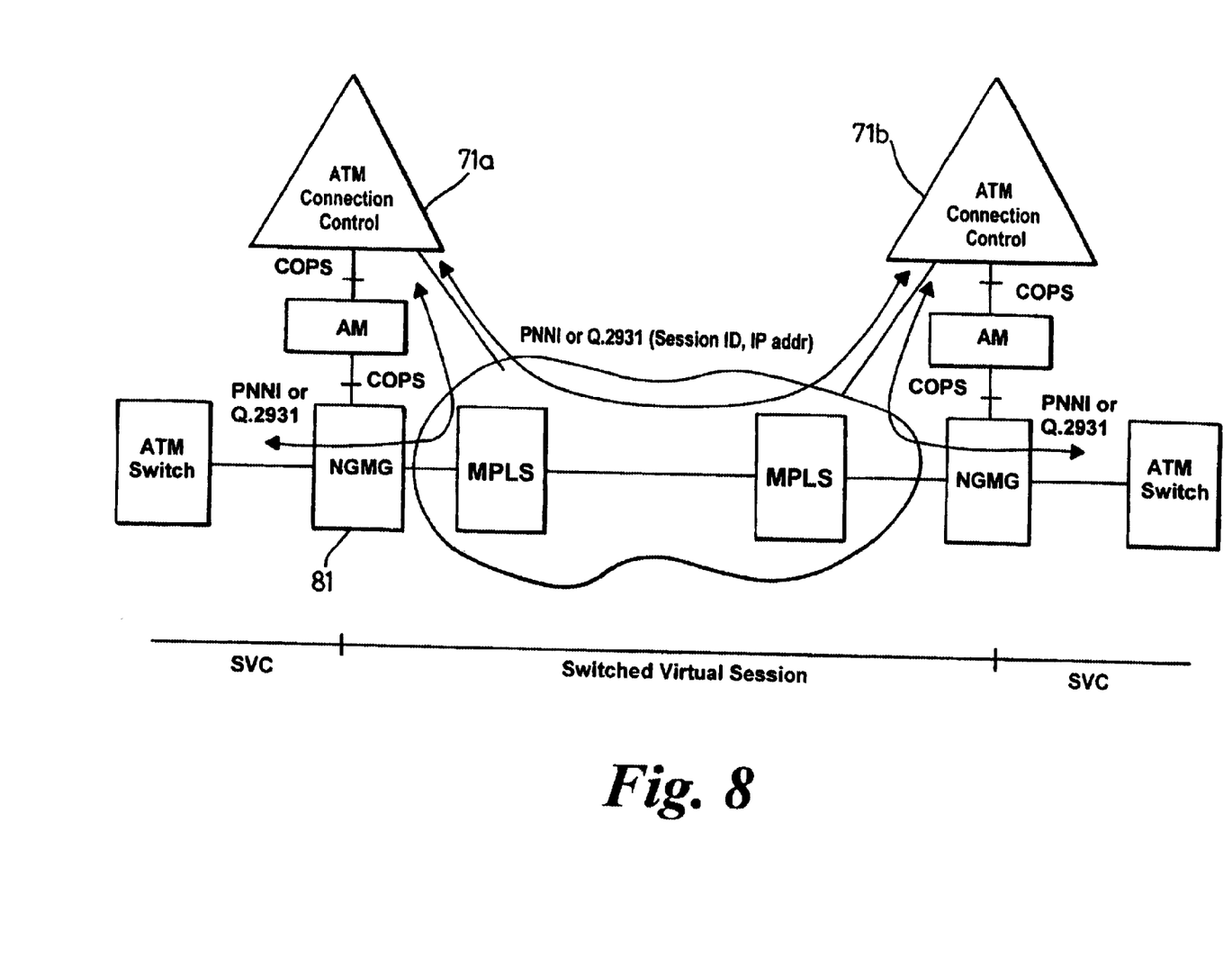
FIG. 8 is further network architecture for supporting ATM services.

FIG. 8 shows a further network architecture for delivering ATM services. In this arrangement, the call server function is provided by an ATM connection control 71a, 71b. For example ATM signalling when interpreted at the NGMG 81, would have the Q.2931 (or PNNI) signalling for the SVC directed to an ATM call processor. The ATM call processor terminates the signalling and communicates with the Admission Server via COPS, to request the connection across the core network. The Admission Server (in conjunction with the Connection Servers) effectively performs a call admission control, routing and onward signalling to extend the SVC as an SVS through the MPLS core. By viewing the MPLS core as a single hop from the ATM perspective, then the AESA contained in the Q.2931 (or PNNI) signalling message incoming to an NGMG's ATM call processor, is resolved by the Admission Server into an IP address. The AM uses this IP address to establish an SVS. It then communicates this IP address and a session ID via COPS to the ATM call processor that forwards both these entities in the information element of the Q.2931 (or PNNI) setup message to the destination NGMG's ATM call processor. At the destination ATM call processor, the message receipt, session ID and IP address are forwarded to the Admission Server via COPS to rendezvous with the SVS. The ATM call processor uses the AESA to determine if onward signalling is required, in which case Q.2931 (or PNNI) is used to continue the SVC setup. The NGMG maintains the session/call state controls as well as providing OAMP information appropriate to the ATM access vehicle.

It will be understood that the above description of a preferred embodiment is given by way of example only and that various modifications may be made by those skilled in the art without departing from the spirit and scope of the invention.

What is claimed is:

1. A method of establishing a switched virtual circuit (SVC) between an originating end point and a destination end point in a network incorporating a multiprotocol label switching network, the method including: conveying an IP address of the originating end point and a session identifier across the network to second call connection processing means associated with the destination end point; in response thereto, conveying an IP address of the destination end point together with said session identifier to first call connection processing means associated with the originating end point; defining a plurality of first level paths across the multiprotocol label switching network; defining through said first and second call connection processing means a second level path comprising a concatenated series of said first level paths; transmitting a telecommunications packet over the network between the end points; attaching a label to the packet indicative of said second level path at an ingress to the multiprotocol label switching network; transporting the labelled packet over said second level path; removing the label from the packet; and delivering the packet to the destination end point.

2. A method as claimed in claim 1, wherein said second level path provides a dynamically created end to end quality of service capability.

3. A method as claimed in claim 2, wherein said network is an Internet protocol network.

4. A method as claimed in claim 3, wherein said packets comprise ATM cells.

5. A method as claimed in claim 4, wherein said packets comprise the adaptation and payload portions of ATM cells.

6. A method as claimed in claim 5, wherein said ATM cells conform to an ATM Adaptation Layer 1 or Adaptation Layer 2 format.

7. A telecommunications network incorporating a multiprotocol label switching network arranged to establish a switched virtual circuit (SVC) between an originating end point and a destination end point, the telecommunications network including: first call connection processing means associated with the originating end point for conveying an IP address of the originating end point and a session identifier to second call connection processing means associated with the destination end point, said second call connection processing means being arranged to respond to receipt of said session identifier by conveying an IP address of the destination end point together with at least the session identifier to the first call processing means; means for defining a plurality of first level paths across the multiprotocol label switching network, said first and second call connection processing means defining a second level path comprising a concatenated series of said second level paths; means for attaching labels to telecommunications packets being transmitted between said end points, said labels indicative of said second path level, at an ingress to the multiprotocol label switching network; transporting the labelled packets over said second path level; removing the labels from the packets; and delivering the packets to the destination end point.

8. A telecommunications network as claimed in claim 7, wherein said multiprotocol label switching network incorporates a plurality of abstract nodes.

9. A telecommunications network as claimed in claim 8, wherein said concatenated paths comprise tunnels defined between said abstract nodes.

10. A telecommunications network as claimed in claim 9, wherein said abstract nodes are served each by a connection manager whereby communications paths between the abstract nodes are established in said tunnels.

* * * * *